J. W. HYATT.
APPARATUS FOR CONTINUOUSLY PRESSING ICE FRAGMENTS INTO AN ENDLESS BAR.
APPLICATION FILED SEPT. 21, 1915.

1,221,054.

Patented Apr. 3, 1917.
2 SHEETS—SHEET 1.

Inventor
John W. Hyatt, per
Thomas S. Crane, Atty.

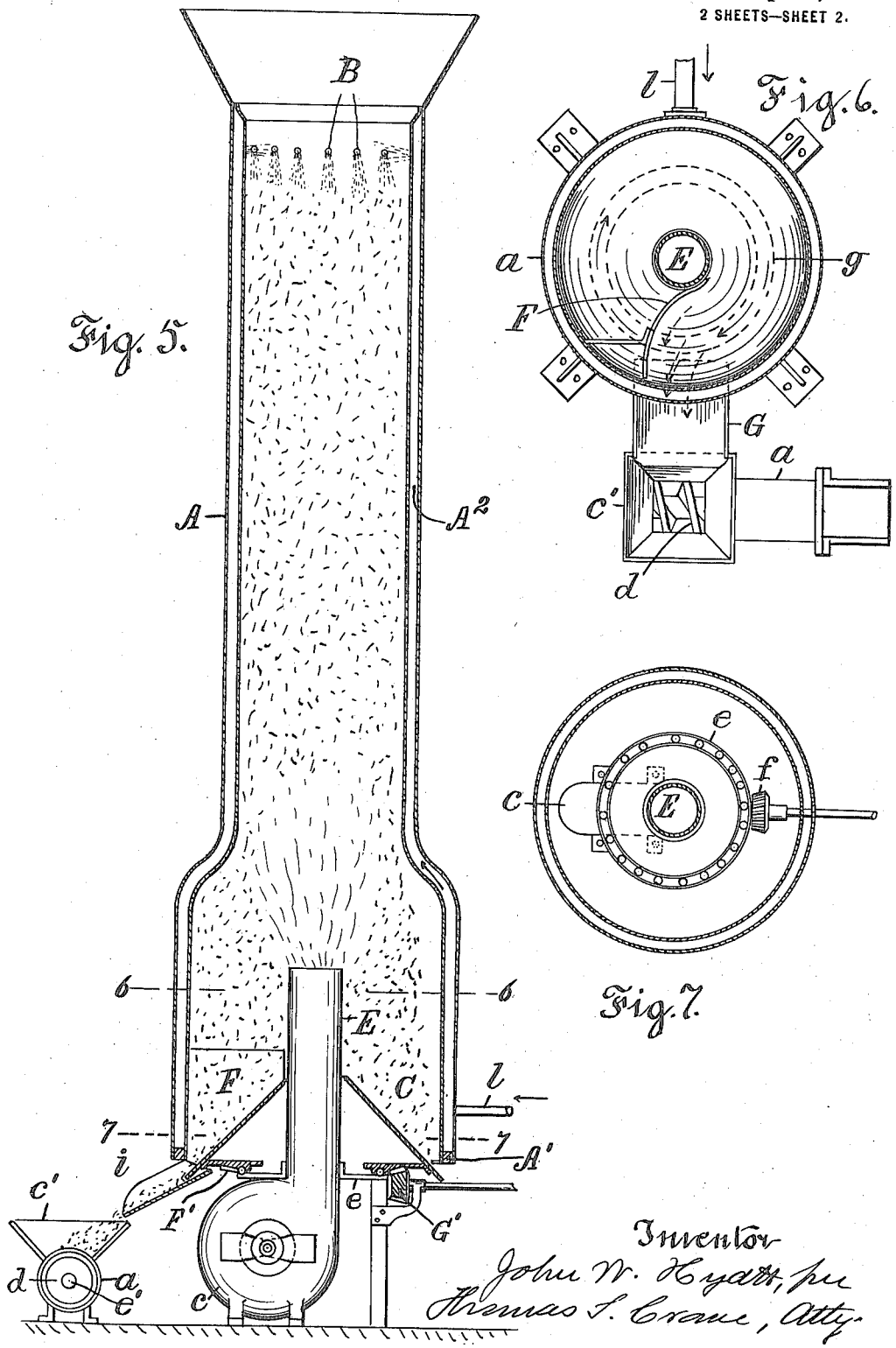

UNITED STATES PATENT OFFICE.

JOHN WESLEY HYATT, OF PLEASANTDALE, NEW JERSEY.

APPARATUS FOR CONTINUOUSLY PRESSING ICE FRAGMENTS INTO AN ENDLESS BAR.

1,221,054. Specification of Letters Patent. Patented Apr. 3, 1917.

Application filed September 21, 1915. Serial No. 51,863.

*To all whom it may concern:*

Be it known that I, JOHN W. HYATT, a citizen of the United States, residing at Pleasantdale, county of Essex, and State of New Jersey, have invented certain new and useful Improvements in Apparatus for Continuously Pressing Ice Fragments into an Endless Bar, fully described and represented in the following specification and the accompanying drawings, forming a part of the same.

This invention relates to an improved means of utilizing ice in scales, films, icicles, or small fragments of any shape; and the object of the invention is to furnish an apparatus which can be continuously fed with such fragments and the fragments continuously compressed and delivered continuously in a homogeneous endless bar.

The production of the fragments may be made by any suitable apparatus, one of which is shown herein, and the compressing of the fragments into an endless bar is effected by rotating a spiral worm within a cylinder and continuously forcing the fragments thereby through a tapering delivery die which, in practice, has one side-wall secured adjustably upon the die, so that its angular relation to the opposite wall may be varied, as required, to vary the resistance to the passage of the ice, and thus adapt the machine to operate upon ice fragments of various consistencies, whether hard or spongy or dry or wet.

Figure 1:
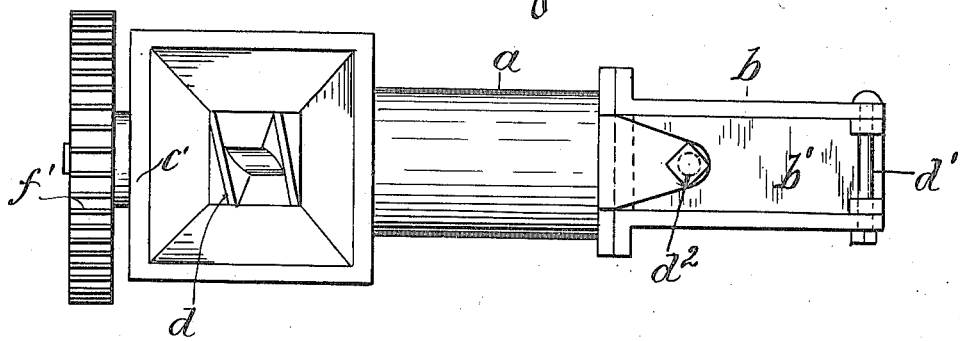
Figure 2:
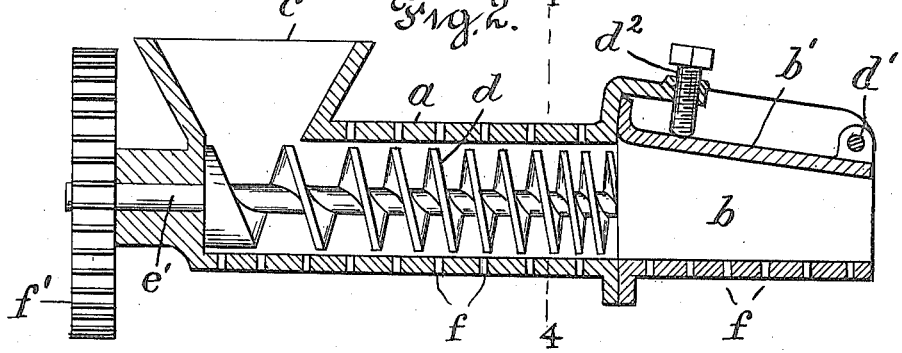
Figure 4:
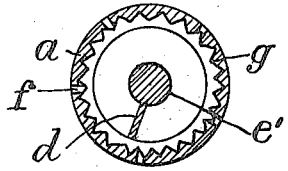
Figure 3:
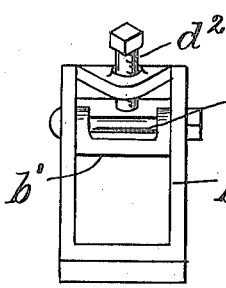

The invention will be understood by reference to the annexed drawing, in which Figure 1 is a plan of an extrusion machine to form a continuous bar of ice; Fig. 2 is a longitudinal section of the same; Fig. 3 is an end view of the die upon the body of the machine; and Fig. 4 is a section on line 4—4 in Fig. 1. Fig. 5 is a vertical elevation of a freezing tower with the casing and rotating parts in section; Fig. 6 is a plan of the same in section on line 6—6 in Fig. 5; and Fig. 7 is a plan of the same on line 7—7 in Fig. 5.

I will first refer to the extrusion machine, which consolidates the ice fragments, as the source for supplying the fragments is immaterial, and will then describe the means shown in Fig. 5 for producing and delivering the continuous supply of fragments to the extrusion machine.

The machine is shown with a cylindrical body $a$ having an opening in the top which is provided with a hopper $c'$ to receive the ice fragments, and having upon its delivery end a tapering die $b$, as shown in Figs. 1 and 3.

The ice fragments falling into the hopper are propelled or forced forward by a revolving worm $d$ which is mounted to turn in the cylinder and its shaft $e$ extended outside of the same to be rotated by gearing $f'$. The cylinder is preferably fluted longitudinally, so as to prevent the turning of the ice around in the cylinder and confine it to a forward movement.

The die is formed with a movable top side $b'$ held adjustably to the side-walls of the die by a bolt $d'$, and set-screw $d^2$, so that it may be inclined from the junction of the die with the cylinder to the outer or delivery end.

Such inclination is necessary to produce sufficient resistance to the movement of the ice fragments to produce a consolidation of the same, as they would obviously suffer no consolidation in passing through a die with parallel walls. Such movable side is arranged to gradually contract the space through which the ice fragments are forced, thus compacting them together and furnishing the resistance and change of form required to produce the desired consolidation.

The degree of resistance required to compact the frozen fragments obviously varies with their condition, whether they are hard and crystalline or soft and spongy, and the movability of the side upon the die permits it to be adjusted at a greater or less angle to the path of the fragments to produce the desired result.

The continuous production of ice fragments to supply the extrusion machine continuously may be effected by the means shown in Fig. 5, consisting of a tower with double walls A closed at the bottom A' and the interspace $A^2$ supplied with water by pipe $l$.

The openings B upon the inner wall, near the top, discharge the water which falls toward the bottom of the tower. A conical turntable C is supported by a ball-bearing upon an annular plate $e$ in the bottom of the tower, and a fan-blower $c$ is arranged beneath the plate $e$ and its nozzle E projected upwardly through the cone, to discharge air upwardly against the falling spray. Gearing F', G' rotates the cone.

The device is preferably operated when the atmosphere is below the freezing temperature, which causes frozen spray to fall upon the cone, where a scraper F scrapes off the ice into a chute, which delivers the fragments into the hopper c' of the extrusion machine. By such means a continuous supply of ice fragments is discharged into the hopper and the fragments compacted and discharged in a continuous bar from the die b.

Where it is desired to compact the ice into a perfectly clear mass, it is necessary to expel the air in some way, and this may be done by filling the interstices between the fragments with water before or while they are being pressed, the pressing action then expressing the water from the interstices, which water is discharged, through suitable apertures, from the extrusion machine in which the compacting of the ice particles is effected.

In Figs. 2 and 3, holes f are shown to thus discharge the water. In Fig. 4, the interior of the cylinder is shown formed with longitudinal grooves g to prevent the ice from rotating with the propelling worm, and confine it to a longitudinal movement into the die.

It will be observed in Fig. 2 that the delivery end of the worm terminates at the inner end or mouth of the die, so that the ice moving between the tapering walls of the die is not agitated or broken up by the thread of the worm, but is forced directly forward.

Fig. 2 also shows the worm with a pitch gradually diminishing from the hopper to the inner end of the die, which construction continuously kneads and works the ice fragments together until they are delivered into the die in a most compact condition.

It is obvious that the threads of greater pitch beneath the hopper propel the ice forward more rapidly than the threads of less pitch near the die, so that the mere operation of the threads in the worm tends to consolidate the ice materially independent of the tapering walls of the die.

This extrusion machine is far more effective than any means for merely pressing the ice fragments in a mold, because mere direct pressure does not produce the kneading, wedging and working together of the ice fragments which is produced in an extrusion machine employing a tapering die through which the ice is forced.

In an extrusion machine employing a revolving worm, the rubbing of the worm against the ice fragments serves to shift the fragments upon one another and crowd them together in such manner that a homogeneous mass results.

The great advantage of a continuous operation of the ice-pressing or molding apparatus is obvious, as it may be adjusted to operate upon the class of fragments with which it is continuously supplied, and will operate continuously thereafter without any material attention or attendance.

By reason of its continuous operation, it is also far more economical than a machine in which the ice fragments are pressed by a reciprocating die, which can only be charged intermittently and operates upon the fragments only a portion of the time; while in my apparatus no time is lost in reversing the machine to empty or charge it.

Having thus set forth the nature of the invention what is claimed herein is:

1. The machine for continuously pressing ice fragments into an endless bar, which comprises a cylinder having a tapering die at one end and a hopper at the opposite end, the die having a side-wall hinged at the end next the cylinder and provided with means for adjusting and supporting its opposite end, means to supply the hopper continuously with ice fragments, and a worm rotated within the cylinder and operating to compact the ice fragments and force them continuously through the die in the form of a continuous ice-bar.

2. The machine for continuously pressing ice fragments into an endless bar, which comprises a cylinder having a tapering die at one end and a hopper at the opposite end, a worm rotated within the cylinder and having its pitch diminishing from the hopper to the said die, and means for continuously supplying ice fragments to the said cylinder.

3. The machine for making a continuous bar of ice, which comprises a cylinder having perforated walls and longitudinal grooves in such walls, and provided at one end with a hopper and at the opposite end with a tapering die, and a worm having its pitch diminishing from the hopper to the said die to knead and work together the ice fragments in their progress through the machine.

In testimony whereof I have hereunto set my hand.

JOHN WESLEY HYATT.